2,820,072

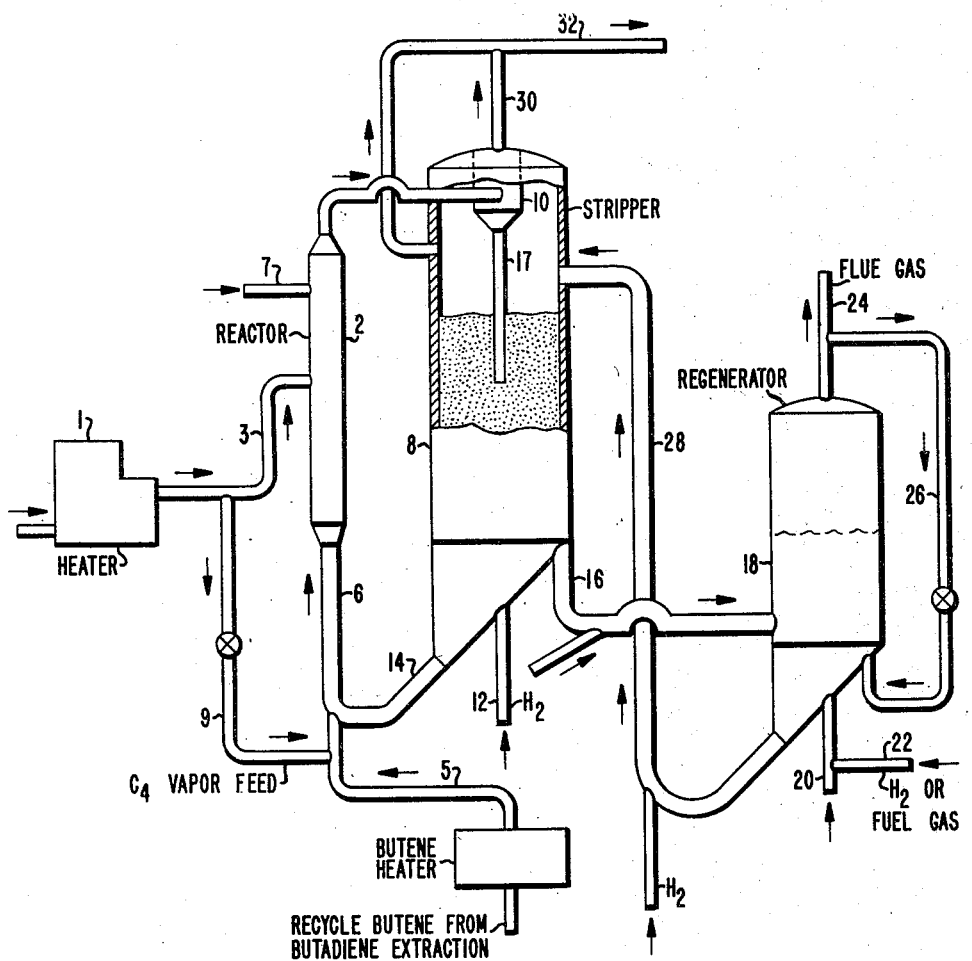
DONALD W. WOOD
DANIEL S. MAISEL      INVENTORS
JOHN C. HUNT
BY Richard H. Nagel ATTORNEY

CATALYTIC DEHYDROGENATION IN TRANSFER LINE REACTOR

Donald W. Wood, Highland Park, Daniel S. Maisel, Union, and John C. Hunt, Linden, N. J., assignors to Esso Research and Engineering Company, a corporation of Delaware Application April 25, 1955, Serial No. 503,456

9 Claims. (Cl. 260—680)

The present invention is directed to a method for dehydrogenating hydrocarbons. More particularly, the present invention is directed to a process for dehydrogenating normally gaseous and low-boiling paraffins, isoparaffins, or olefins into the corresponding olefins and/or diolefins. Still more particularly, the present invention is concerned with a novel technique for dehydrogenating two or more materials concomitantly under conditions to minimize undesirable thermal polymerization and cracking reactions.

Prior to the present invention it has been conventional to dehydrogenate paraffins to mono-olefins and olefins to diolefins in the presence of catalysts. Such catalysts may comprise mixtures of magnesium oxide, an iron group metal oxide, and an alkali or alkaline earth promoter, as well as a group I, II or III metal oxide stabilizer. A chromia-alumina catalyst has been particularly useful in this service. For example, the dehydrogenation of normal or iso butane to the corresponding butylenes is carried out commercially generally by two methods. One of these involves the use of catalyst in tubes of relatively small diameter, which are heated on the outside to supply the endothermic heat of dehydrogenation. In another process, the catalyst is in the form of a bed. Both of these processes are cyclic in nature, it being necessary to regenerate the catalyst frequently by burning off the carbon. In the latter process, the heat capacity of the bed is used to furnish the heat of dehydrogenation, the bed temperature dropping during the "make" period and increasing again during the regeneration or carbon burning period.

In the dehydrogenation of normal butylenes to butadiene, one process employed extensively commercially involves the use of a bed of steam-resistant catalyst operating with a very high mol ratio of steam to butylenes. This high ratio has been found necessary from thermodynamic considerations for reducing the partial pressure, and also serves to provide sufficient heat capacity to supply heat for the dehydrogenation reaction so that a reasonable conversion, to the extent of 20 to 40% can be obtained, and also for removing carbon deposits by water gas reaction. In another process, butane or butylenes are dehydrogenated with catalyst in tubes of small diameter, with the heat furnished indirectly by heating the tubes. Alternately, the catalyst may be in the form of a bed with the heat of reaction being supplied by the sensible heat of the bed. In both these cases steam-sensitive catalyst is usually employed, so that the low partial pressure is obtained by operating under a vacuum. The first of these processes is costly, for it requires the handling of very large amounts of diluent steam. The latter two processes are costly because of the high cost of the reactors and the accompanying problems in obtaining low enough pressure drop through the catalyst bed. In addition, these processes are cyclic in nature and require frequent catalyst regeneration with accompanying complex timing and flow control valve equipment. For example, the fixed bed process may require seven reactors with three reactors being on stream, three on regeneration, and one on purge operation. The length of time on reaction or regeneration is of the order of 6–10 minutes. This results in frequent flow changes. The upper temperature in a fixed bed is usually limited by coke deposition on the catalyst even though higher temperatures may be desirable to give yield advantages.

A significant step forward in solving the problems enumerated above, particularly in those installations employing fixed bed operation, was the introduction of the fluid solids type of operation. This technique, which is particularly well-known in the cracking of petroleum art, involves the maintenance of a dense bed of finely-divided solids fluidized by upward-flowing gas streams in a reactor. Customarily known as a hindered settler type bed having a reasonably well-defined upper level, it affords an excellent means of temperature control and intimate mixing and contact of catalyst with reactants. Furthermore, it permits continuous regeneration of catalyst by withdrawal of a sidestream for burning off the deposited carbon in a regenerator vessel; concomitantly, the heat necessary for the reaction is supplied by return of the heated regenerated catalyst, thus making unnecessary the use of indirect heating through tubes.

Desirable and advantageous as it is to apply the hindered settler technique to the dehydrogenation of paraffins and olefins, the process has certain limitations when employed in this service. Chief among these are the difficulty of maintaining a uniform short contact time of the gas or vapor being dehydrogenated with the catalyst, and the high degree of mixing and consequent uniformity of composition in the bed. For example, velocities in a hindered settler are limited to a velocity less than that which would entrain the catalyst. In order to maintain a desirable short contact time of the order of 0.1–1.0 second, would require use of a low (length/diameter) ratio which would in general not be practical. It is also highly advantageous to carry out dehydrogenation operations at low partial pressures of hydrocarbons, particularly when it is desired to obtain good yields of dienes at high conversion of the hydrocarbon feed.

A significant and further step forward was taken by the suggestion that hydrocarbon dehydrogenation be carried out in a transfer line reactor system. This involves carrying out a catalyst vapor phase dehydrogenation reaction continuously in a reactor of relatively small diameter wherein the catalyst, maintained at a critically controlled reaction temperature, is carried in suspension concurrently with a stream of reactant vapor through the reaction zone for a uniform short reaction period, then is abruptly disengaged from the resulting gaseous reaction products, reactivated, and returned at the desired temperature to the reaction zone.

The reaction is most advantageously carried out in a reactor of relatively small diameter, best designated as a transfer line reactor. By use of the transfer line reactor, not only are there realized the advantages of fluid catalysts generally in supplying high heat capacity and good heat transfer; the transfer line reactor also permits thus a uniform short reaction time, i. e., every catalyst particle is in contact with the reactant vapors to the same extent as every other particle whereas in the hindered settler type of operation, because of turbulence and mixing, only an average uniformity of contact time is realized. Back mixing of products is largely eliminated and material yield advantages are achieved since polymerization and cracking reactions are minimized. It is therefore possible to cary out dehydrogenation reactions at very high conversion levels by increasing the temperature and using very short contact times to achieve higher product yields than can be obtained in the conventional lower temperature fixed bed type of reactor. More rapid quenching is also realized in a transfer line, a factor of great importance in the production of diolefins such as butadiene. In a hindered settler, a dilute or dispersed phase exists above the bed. Undesirable thermal cracking and polymerization may occur here since the product is at a high temperature, not in contact with catalyst. Furthermore, a transfer line reactor makes use of vacuum operation more practicable than with conventional fluidized and solid beds with resulting high pressure drop. Thus hydrocarbon vapor is injected into a transfer line reactor, thereby providing circulation of fluidized catalyst which flows from a stripper. The solids flow and entering temperature level are sufficient to provide the heat capacity to supply heat of dehydrogenation and to supply any sensible heat required to bring feed to reaction temperature. The solids-gas mixture is separated in a centrifugal separator so designed as to give minimum contact time, the solids passing through a dip-leg into the stripper vessel, while the gas is taken off the top and quenched immediately.

Adsorbed and entrained reaction products are removed from the catalyst in the stripper, but this is not always essential. The stripper may contain stages obtained by use of baffles, bubble cap trays, or the like. A convenient gas for stripping is hydrogen from the process. Stripped catalyst is withdrawn continuously and fed to the regenerator, using hydrogen or fuel gas to supply a heat and fluidizing medium, and carbonaceous materials removed by combustion. Similarly, regenerated catalyst is fed back continuously to the system, for example, to the top of the stripper or to the reactor. Carbon is burned off in the regenerator by use of air, preferably with a flue gas circulation system, so that the oxygen concentration at any one point is not too high. Heat of dehydrogenation is supplied by introducing spent hydrogen or fuel gas into the regenerator, or burning it with air before introduction into the regenerator and by burning carbon on the catalyst in the regenerator.

When dehydrogenating butane or isobutane to corresponding butylenes, the pressure at the end of the transfer line reactor can be atmospheric or somewhat above. However, when dehydrogenating butylenes or butane to butadiene, a higher temperature is required and a vacuum is maintained at the end of the transfer line reactor. Obviously, the same general setup can be employed when using steam as diluent in dehydrogenation of butylenes to butadiene in which case the reactor pressure would be atmospheric or somewhat higher.

The pressure in the regenerator is maintained somewhat above atmospheric pressure. When vacuum is used in the transfer line reactor, the difference in height between the regenerator and the solids level in the stripper must be such as to permit flow of catalyst into the regenerator without breaking the seal.

In accordance with the present invention, one-step conversion of butane to butadiene is carried out in a modified fluid system. Fresh butane feed and a butene recycle stream from a cuprous ammonium acetate butadiene extraction unit are dehydrogenated in the presence of a chromia-alumina catalyst at 1150–1550° F. with a contact time of 0.1 to 1 second. This invention is concerned with a modification of the process which increases the overall selectivity. Generally, the butane and butene recycle are mixed and fed into the bottom of the reactor. However, since the rate of butene dehydrogenation to butadiene is much slower than the rate for butane to butene, the fresh butane should be introduced at an intermediate point in the reactor and only the butene fed to the bottom. This design allows sufficient contact time for the butene to react and form butadiene and provides enough time for butane to dehydrogenate and form an equivalent amount of butene. In this way the butane residence time is less than in the conventional transfer line system and therefore the amount of thermal degradation decreases with a subsequent increase in the over-all selectivity of the process. In addition, the lower part of the reactor can operate at a very high temperature (in the range of 1350–1500° F.) where most of the conversion to butadiene can take place with butane injection combined with the endothermic dehydrogenation of butane to butene acting as a rapid quench. The butane can then react to form butene in the upper part of the reactor and at the lower temperature where butadiene polymerization and cracking, as well as butane and butene cracking, are minimized. An additional unique advantage gained is to increase the catalyst to butene ratio in the lower part of the reactor. This results in improved selectivity to butadiene.

The process of the present invention will best be understood when read in accordance with the following figure, wherein there is shown a preferred embodiment of the present invention.

Referring now to the figure, the reaction tube 2 is a vertical tubular conduit of relatively narrow cross-section, into the bottom inlet of which is fed $C_4$ hydrocarbon preheated in fired coil heater 1, the fresh vapors being passed initially into the bottom of the reactor through lines 9 and 6.

Preheating temperatures are in the range of 100° to 1150° F. Finely-divided catalyst from stripper 8 is suspended by the oncoming gas stream and carried upwardly through the tube, whose upper end discharges into cyclone or other type separator 10. Spent catalyst is disengaged abruptly from the vaporous product stream in separator 10 and drops downwardly through dip leg 7 into stripper 8, a vessel which may be equipped with baffles, bubble cap trays, and the like, to provide stripping in stages and adequate contact of gases and solids.

Stripping gas, such as spent $H_2$ from the process is injected into the stripper 8 through line 12 to remove entrained vapors from the catalyst, and also to serve to maintain a fluidized solids bed of catalyst within the vessel. This bed provides a pseudo-hydrostatic pressure, thus acting as a standpipe, and serves not only to provide catalyst flow to the transfer line reactor through line 14 but also serves to provide catalyst flow to regenerator 18 through line 16. It should be noted that the arrangement shown in the figure provides for circulating catalyst from the stripper to either the regenerator or to the reactor. However, it may also be desirable to circulate all catalyst to the regenerator from the stripper, and return the catalyst from the regenerator directly to the reactor.

The catalyst enters reaction 2 through line 14 at a rate sufficient to provide the desired sensible heat and endothermic heat of reaction. The temperature of the gas in line 9 is 100°–1150° F. while the catalyst in line 14 is at a temperature of 1150°–1550° F. The reaction, therefore, can be carried out at an average temperature of 1150°–1550° F. The vapor velocity is regulated between 5 and 100 ft./sec. in order to maintain a catalyst density in reactor 2 of from 0.5–10 lbs./ft.$^3$ when the catalyst particle size is 80–400 mesh and also to provide a vapor residence time of from 0.1 to 1 second. When dehydrogenating butane or butylenes to butadiene, a pressure of 100–400 mm. Hg is maintained in reactor 2.

Steam diluent may also be employed instead of vacuum in the dehydrogenation of butylenes to butadiene, but the invention realizes its greatest utility by dispensing with the necessity of generating and handling large quantities of steam and in allowing direct one-step dehydrogenation of butane to butadiene.

As the reaction proceeds, recycle butylene from the butadiene extraction unit, as detailed more clearly below, is passed through butene heater 4 and into the bottom of reactor 2 through lines 5 and 6 while the fresh butane feed is now passed into an intermediate portion of reactor 2 via line 3. Thus the butane residence time is substantially shorter than when introduced at the bottom. Butane residence time when introduced at bottom may be in the range of 0.5 to 1 second at 1300–1500° F. Butane injection at an intermediate point in the reactor reduces this to 0.1 to 0.5 second at 1150–1300° F. with a butene residence time of 0.1 to 0.5 second at 1300–1500° F. in the lower section of the reactor. The result of fresh butane injection into the intermediate portion of the reactor likewise acts as a quench and decreases the temperature in the upper portion from the 1300–1500° F. obtainable in the lower zone to about 1150–1300° F. This is adequate for converting butane to butene, and also decreases the extent of time to which the butadiene formed at the high temperatures obtaining in the lower zone is exposed to these temperatures. Used catalyst from stripper 8 is withdrawn through aerated line 16 and passed to regenerator vessel 18, wherein the catalyst being regenerated is maintained either as a dense, fluidized bed or as a transfer line bed by upwardly flowing regeneration gases, such as air, admitted through line 20. To provide the necessary heat, a fuel gas, such as methane, ethane, or spent hydrogen may be advantageously introduced through line 22. The gases resulting from the combustion of carbon on the catalyst, and from the fuel gases, are withdrawn overhead through line 24. A portion of these gases may be advantageously recirculated to the regenerator through line 26, so that the oxygen concentration at any one point is not too high.

The velocity of the upwardly flowing gases in the regenerator is adjusted so as to maintain a catalyst fluidized bed density of 25–40 lbs./ft.$^3$. The regenerator is operated at a superatmospheric pressure of 1–5 lbs./in.$^2$. Since the heat released by combustion of the carbonaceous deposit on the catalyst generally is not sufficient to heat the catalyst to 1150–1550° F., hydrogen or other fuel gases are burned in the regenerator to supply the additional heat requirement. When vacuum is used in the transfer line reactor, the difference in height between the regenerator and the solids level in stripper 8 must be such as to permit flow of catalyst into the regenerator without breaking the seal.

The heated regenerated finely-divided catalyst solids are returned to the stripper vessel 8 through line 28 by pressure exerted by the pseudo-hydrostatic head of the dense bed maintained in regenerator 18. Solids flow from regenerator 18 and the regenerated solids may be returned to vessel 8 at a point above the upper layer of the dense fluidized bed maintained in that zone. As described above, it is also possible to return all regenerated catalyst directly to the reactor tube. In this case catalyst flow is from reactor to stripper to regenerator and thence back to the reactor.

Returning now to the transfer line reactor, the gas-solids mixture is separated in centrifugal or cyclone separator 10 so designed as to give minimum contact time of gases with hot solids, and the gas is withdrawn overhead through line 30 and immediately quenched. As quenching fluid there may be employed water or an oil.

The quenching, recovery and butadiene extraction systems are conventional and form no part of the present invention. Briefly, the reaction products may be quenched immediately by a cold oil stream, the reaction products separated and passed to a butadiene extraction unit, where butylenes are separated from the diolefin. The recovered butylenes are then recycled at least in part to reactor 2 via lines 5 and 6 in the manner set forth above.

As known to those familiar with the art, the types of catalyst which may be employed for dehydrogenation are varied, including nickel, alumina, compositions of alumina with chromium, tungsten or molybdenum, metallic oxides such as copper, cobalt, nickel and the like; a particularly outstanding catalyst is one consisting of a major portion of magnesium oxide, a minor portion of iron oxide, a promoter such as potassium carbonate, and a stabilizer such as CuO.

Though a dense fluid bed type of catalyst regeneration vessel and system has been shown, it is understood that this may advantageously be replaced by a transfer line type of operation similar to that employed in the dehydrogenation stage itself. Such a system has the advantage of being able to effect regeneration at reduced pressure, not readily attainable with dense bed type of operations.

Though the invention has been described in its application to the catalytic dehydrogenation of butane to butadiene, it is not limited thereto, but is applicable to other reactions, both thermal and catalytic, where it is desirable to vary the contact and residence times of various feed components. Illustrative is the production of butadiene and styrene from butane and ethylbenzene in one reactor. Recycle butene is again introduced into the bottoms portion of reactor 2 through lines 5 and 6 and butane further up through line 3. Ethylbenzene, being the most easily dehydrogenated, is introduced into an upper portion of the reactor through line 7. This arrangement allows the contact time and reaction temperature for each feedstock to be adjusted so that thermal degradation occurs only to a very limited extent. Butene can be dehydrogenated at a very high temperature (1150–1500° F.), the products rapidly quenched by butane injection and dehydrogenation (1150–1300° F.), and the resulting mixture quenched to an even lower temperature by ethylbenzene injection and the subsequent reaction to produce styrene (1150–1300° F.).

The products can be separated readily by conventional distillation and extraction techniques, or the crude dehydrogenate may be used as feed for the production of butadiene-styrene copolymers. After polymerization the butane-butene-ethylbenzene stream can be recycled to the reactor.

Another example is the production of isobutylene and styrene from isobutane and ethylbenzene with isobutane fed to the bottom of the reactor and ethylbenzene at an intermediate point in the reactor. Again, isobutylene and styrene can be recovered by conventional techniques or used as feed for producing an isobutylene-styrene copolymer.

A fourth example is the production of isoprene by dehydrogenating recycle isopentene in the bottom of the reactor at a relatively high temperature and short contact time followed by isopentane injection and dehydrogenation at a lower temperature in the upper section of the reactor.

As an operating example for producing 25,000 S. T./year butadiene in accordance with the process of the present invention, as shown in the embodiment in the drawing, the recycle feed rate to the reactor is 2200 B./S. D. This gas stream has a temperature of 500° F. The fresh butane feed rate is 850 B./S. D. and is at the same temperature of 500° F. The catalyst circulation rate of 10 S. T. minute is maintained and the catalyst feed temperature is 1400° F. Within the reactor a gas velocity of 40 feet per second is maintained and a reactor inlet and outlet pressure of 4 and 2 p. s. i. a., respectively. The reactor outlet temperature is 1200° F. Under these conditions the residence time below the injection point wherein gas enters through line 3 is 0.25 second and the residence time above the injection point is also 0.25 second.

What is claimed is:

1. An improved process for dehydrogenating a hydrocarbon stream into more unsaturated compounds which comprises suspending a preheated dehydrogenation catalyst in a vapor stream of said hydrocarbon in a dehydrogenation zone, passing the suspended catalyst uniformly and substantially at the same velocity as the reactant vapor upwardly through said reaction zone for a contact period of less than one second, passing a more readily dehydrogenatable hydrocarbon into said zone downstream from said first hydrocarbon injection point thereby rapidly quenching the reaction mixture and minimizing the degradation of product, dehydrogenating said second hydrocarbon in said zone at a lower temperature than said initially injected hydrocarbon, discharging resulting vaporous products and suspended catalyst from the upper end portion of said reaction zone into a separation zone, immediately quenching said vapor products, continuously withdrawing spent catalyst from said system, and withdrawing dehydrogenated hydrocarbons from said system.

2. The process of claim 1 wherein the hydrocarbon injected downstream is a paraffin and said first-named hydrocarbon is an olefin.

3. An improved process for dehydrogenating paraffins and olefins to diolefins which comprises suspending finely-divided hot dehydrogenation catalyst in a vapor stream in a vertical transfer line reaction zone of relatively narrow cross-section, maintaining subatmospheric pressures in said zone, passing said suspended catalyst uniformly and substantially at the same velocity as the reactant vapor upwardly through the reaction zone for a total time of less than 1 second therein, maintaining a temperature gradient in said zone, passing an olefin into a lower portion of said zone, converting said olefin to a diolefin in said lower portion, passing a more paraffinic hydrocarbon into said zone downstream from said olefin injection point, dehydrogenating said paraffin to a mono-olefin at a temperature less than said olefin dehydrogenation temperature and concomitantly quenching said diolefin to minimize degradation of product, and withdrawing olefins and diolefins from the upper portion of said reaction zone.

4. An improved process for dehydrogenating a butane-comprising stream into butadiene which comprises passing finely-divided dehydrogenation catalyst preheated to a temperature in the range of about 1150° to 1450° F. to a dehydrogenation zone, suspending said catalyst in a vapor, passing said butane into an intermediate portion of said dehydrogenation zone, thereby rapidly quenching the product mixture and minimizing degradation of product, converting said butane into a product comprising butylenes, withdrawing said product from an upper portion of said zone, separating said butylenes, recycling at least a portion of said butylenes to said reaction zone, passing said recycled butylenes into a lower portion of said reaction zone upstream from the butane injection point, maintaining a higher temperature in said lower portion of said zone than in said intermediate portion, converting said butylenes to butadiene and passing said butadiene from said lower portion to said intermediate portion of said zone where said butadiene product is rapidly cooled by said freshly injected butane and the endothermic heat of reaction thereof, and withdrawing said butadiene from said reaction zone.

5. The process of claim 4 wherein the temperature in the lower portion of said zone is about 1300–1500° F. and in said intermediate portion about 1150° to 1300° F.

6. The process of claim 4 wherein the pressure in said zone is about 100–400 mm.

7. An improved process for preparing a mixture of butadiene and styrene from butane and ethyl benzene in a single reaction zone which comprises passing finely-divided dehydrogenation catalyst, preheated to about 1150° to 1450° F., to a dehydrogenation zone, suspending said catalyst in a vapor, passing said butane into an intermediate portion of said dehydrogenation zone, converting said butane into a product comprising butylenes, whereby a rapid quench is effected thus minimizing product degradation passing recycle butylenes from the process to a lower portion of said reaction zone, converting said butylenes into butadiene, passing said butadiene upwardly through said transfer line reaction zone, passing ethyl benzene into an upper portion of said reaction zone downstream from said fresh butane injection point, dehydrogenating said ethyl benzene to styrene and withdrawing a mixture of styrene and butadiene from said reaction zone.

8. An improved process for preparing a mixture of isobutylene and styrene suitable for conversion to a synthetic polymer which comprises passing isobutane to the lower portion of a transfer line catalytic dehydrogenation zone, converting said isobutane to butylene, passing said isobutylene upwardly through said zone, passing ethyl benzene into an intermediate portion of said zone, dehydrogenating ethyl benzene in said intermediate portion to styrene at a temperature lower than that obtaining in the lower portion of said zone and withdrawing from an upper portion of said zone a mixture of isobutylene and styrene.

9. The process of preparing isoprene from isopentane which comprises passing isopentane into an intermediate portion of an up-flow catalytic transfer line dehydrogenation zone, converting said isopentane to isopentene, withdrawing isopentene from said zone, recycling at least a portion of said withdrawn isopentene to the lower portion of said dehydrogenation zone, converting said isopentene in said lower portion to isoprene, passing said isoprene upward through said zone, cooling said isoprene by said fresh isopentane introduced in said intermediate portion and withdrawing said isoprene from the upper portion of said reaction zone.

References Cited in the file of this patent

UNITED STATES PATENTS

| | | |
|---|---|---|
| 2,363,824 | Wolk | Nov. 28, 1944 |
| 2,376,549 | Mavity | May 22, 1945 |
| 2,403,375 | Kassel | July 2, 1946 |
| 2,460,404 | Ward | Feb. 1, 1949 |